United States Patent Office.

THOMAS WILLIAM CLARKE AND WILLIAM S. DEXTER, TRUSTEES, OF BOSTON, MASSACHUSETTS, ASSIGNEES OF JAMES D. WHELPLEY AND JACOB J. STORER.

*Letters Patent No.* 53,208, *dated March* 13, 1866; *reissue No.* 3,857, *dated March* 1, 1870.

IMPROVEMENT IN THE USE AND APPLICATION OF FUEL IN METALLURGIC AND OTHER FURNACES.

The Schedule referred to in these Letters Patent and making part of the same.

*To all whom it may concern:*

Be it known that we, JAMES D. WHELPLEY and JACOB J. STORER, of Boston, in the county of Suffolk, and State of Massachusetts, have invented a new and useful Improvement in the Use and Application of Fuel in Metallurgic and other Furnaces; and we do hereby declare that the following is a full, clear, and exact description of the process and operation of the same. But as the machinery in the operation of this process and method is not claimed by us in this present application for a patent, but has been already partially invented, claimed, and granted to us by Letters Patent of the United States, viz: No. 36,580, dated September 30, 1862; No. 44,990, dated November 8, 1864; No. 48,226, dated June 13, 1865; No. 49,187, dated August 1, 1865 No. 50,975, dated November 14, 1865 we shall refer only to the drawings accompanying said Letters Patent, so far as they may be necessary in explaining our specifications.

The nature of our improvement consists in the use of waste fuels, such as the refuse of coal-mines and coal-yards, which are usually broken too small to be employed with economy upon grate-bars and in furnaces of the ordinary construction, so as to obtain from them as high degrees of temperature and as rapid and uniform combustion as can be obtained from lump or massive coal.

We are aware that refuse coals such as are described have been economized by making them up into small masses, called bricks, with some adhesive substance, and burning them afterward as lump fuel, but the economy of this method of saving waste fuel is much less than that of the one which we are about to propose.

As the first step in the preparation of coal by our method, we reduce it to an excessively fine powder, so that every particle may be easily floated upon an air-blast for a distance of from twenty to fifty feet, more or less, as may be required by the length of the combustion-chamber. The finer the pulverization, the better will be the result.

The entire mass of fuel must be pulverized so finely that nearly the whole, say seventy-five per cent., more or less, will pass through a screen of ten thousand holes to the square inch of surface. Particles more than one two-hundredth part of an inch in diameter will be found too large for rapid and perfect combustion by our method. If a cubic inch of coal be broken so small that each particle shall be less than one-thousandth part of an inch in diameter, the surfaces of all the broken particles taken together will expose more than forty square feet of superficial area. It is obvious that so large an extent of surface exposed to the action of radiant heat, in contact with atmospheric oxygen, will produce a combustion as much more rapid and complete in a given time as an area of forty square feet is greater than an area of six square inches, which is equal to the surface of the cubic inch of coal.

By means of our patented pulverizer, coal and other brittle and combustible substances may be pulverized to excessive fineness by the use of a steam-power generated by a weight of fuel not in any instance exceeding eight, and with the softer coals not exceeding four per cent. of the weight of the materials pulverized. Since there is no other mechanism of this kind known, it may be regarded for the present as essential to the preparation of floated or finely-pulverized fuel. In practice, by the use of this machinery, we find that the reduction of the fuel is much finer than that described above, a considerable portion, usually one-half of the entire mass, having a surface extended to three hundred square feet for the weight of a cubic inch of material.

It is necessary for best economies that the coal or other fuel be dry before it is pulverized, the presence of more than four per cent. of moisture serving to increase the labor of pulverization, and seriously to retard combustion.

Various attempts have been made by experimenters to burn slack or waste-coal dust or culm, or other forms of finely-broken or pulverized fuel, but because no machinery has been known hitherto which would reduce the entire mass of fuel constantly to fine powder with proper economy, to be floated into furnaces upon currents of air, it has not been extensively employed in practice to support combustion. The fuel, as we prepare it, is injected on a moving column of air into the fire-box of a reverberatory or flame furnace, so that it may take fire immediately on entering. The proper place for injecting the fuel with the air is through a slot or opening cut in the back wall of the fire-box, so that the line of projection of the air and fuel may nearly coincide with the long axis of the furnace.

In order to secure the greatest economy of time and labor, we introduce the pulverized fuel directly into the back of the fire-box, by means of the escape-pipe of the pulverizing-machine. We are able to regulate the quantity of air suitable for the combustion of the fuel by governing the valves and slides of the pulverizer. We do not in this present application propose any new form of furnace, the same being subject to further experiment. We can only say, that as our improvement consists in the substitution, in part or wholly, of finely-pulverized fuel for lump or massive fuel, and that as the lump or massive fuel burned upon the grate-bars is to be used only as a temporary auxiliary, to be employed for heating the fire-box at the point where the pulverized fuel is to be blown in, in order that the carboniferous jet or column of air from the blow-pipe of the mill may be heated instantly on entering, so that the indefinitely small particles of floating carbon may take fire by the radiation from the brick-work and from the coals and cinders on the grate, it is our intention, in using and experimenting upon pulverized fuel of the nature prepared and herein specifically described by us, to prefer always furnaces with very small fire-boxes attached to them, and if the furnace to which this process may be applied happens to have a large fire-box, as is usual, for instance, with the reverberatory furnace, as used in puddling and refining pig-iron, the nature of our improvement necessitates the covering of about three-quarters of the grate-bars, which may be done by allowing the cinder and ashes to remain piled up upon them, and even by filling up the waste spaces of the fire-box with broken brick, cinder, and other refuse, so as to reduce the area of useful grate surface and capacity of fire-box to one-fourth or one-fifth of what it was originally.

We also prefer for the application of our process those furnaces which are supplied with a force-blast by a fan-blower or other mechanical means, not only because these are known to be in practice the best for nearly all kinds of combustion, but because we find them to be almost essential to the successful use of the machine blow-pipe carrying pulverized carbon.

After the fire-box is thoroughly heated in furnaces that are best adapted to this process, namely, in those which chance to have very small fire-boxes, and which must be always such as are arched or covered over with brick-work, as is usual, nearly all the air may be cut off from beneath the grate-bars, and the proportion of air and fuel regulated entirely through the mechanism of the pulverizer.

Our method requires, for obvious reasons, a choice of such fuels as take fire easily and instantly upon entering a heated chamber. Such fuels are, especially, bituminous coal, pulverized saw-dust, sulphur, and such sulphides of the metals as are very rich in sulphur. Sulphides of the metals take fire quickly, serve as excellent fuels, igniting at a bright red heat, and burning with great intensity; but it is necessary in practice, in order to secure the proper degree of comminution when using them in this manner, that they should be pulverized by the method and machinery described by us.

We find it practically uneconomical to pulverize the fuel in advance, and subsequently to feed it by a fan-blower or other mechanism into the furnace. The fan-blower used in forcing the air and pulverized fuel into the furnace should be one and the same machine with or forming a part of the pulverizer. And the blow-pipe or exhaust from the pulverizer leads not from the pulverizing-chamber, where the work of pulverization is accomplished, but from the periphery of the auxiliary fan, which forms an essential part of the mechanism of the same.

We are aware that fan-blowers have been used for the injection of slack coal or culm into the fire-chambers of furnaces.

Screens and other mechanisms have been used for the regular or periodical delivery of waste coals, culm, or slack to the fires of steam-boilers or other furnaces. Centrifugal machines have been used for the same purpose, throwing in mixtures of coarse and fine material directly from the periphery or side of their pulverizing-chamber.

We find in an English patent, dated 1846, a plan proposed for pulverizing coal in an externally-heated iron box with pestles, producing what the inventor calls "carbonized air," which is in fact air containing dust of carbon, to be floated in some manner into the furnace. In this invention the theory alone is correct, but the applications and methods either not described, or mechanically impracticable.

In our process of pulverization, the air passing through the pulverizer is heated by the attrition of the material in the mill. This air passing into the furnace or fire-box with the fuel, utilizes the heat of the mill as an agent of combustion, an important economy in the process, and which compensates in part for the cost of pulverization.

Many furnaces are now supplied with blasts of hot air. When we wish to use anthracite coal, we should prefer these furnaces to others, as furnishing greater facilities of combustion.

The hot air is, of course, injected into some part of the fire-box, or through the fire-bridge. The hot air and fuel blasts should, of course, enter at the same point.

In the English patent, No. 2,169, 1856, of Mushet, it is proposed to use pulverized coal "falling or passing from boxes or receptacles into blast-pipes, and then carried in by blast enough to prevent waste or oxidation of iron" in reverberatory furnaces. No device is offered by this inventor by which the air and coal shall be thoroughly and evenly mixed together, a condition which is indispensable to the result which we obtain, that is to say, to the proper combustion of the fuel, nor is the condition of absolute pulverization stated as one essential to the proper success of the operation.

In the process of Mushet it is not necessary that the coal be floated or minutely divided, as in our process. It is sufficient to project or sprinkle the pulverized fuel upon the surface of the metal by means of a blast of air, to enable it to act as a protector against oxidation, which is the purpose of the invention of Mushet.

In our process, on the contrary, the coal is used simply as the prime agent of combustion in place of solid fuel upon grate-bars; and when used with the greatest economy for the production of heat, will be burned to the condition of carbonic acid with an excess of oxygen, tending to oxidize and corrode, instead of protecting iron and other metals.

When, on the other hand, we desire to protect metals against oxidation while using pulverized fuel by our method, we regulate the furnace as it is always regulated by the workmen when they are using massive or lump fuel in puddling, heating, and melting iron or steel.

We limit the quantity of air entering the furnace, as is usual, with a consequent lowering of the heat of the furnace, and imparting a non-oxidizing or neutral character to the flame. In this mode of manipulation there is no novelty.

In using our method, the pulverized fuel, ignited by the radiation of the fire-box as it enters, is burned under the cope or roof of the furnace, and in the flue and chimney beyond.

The small fire upon the grate-bars, after the fire-box is thoroughly heated, may be suffered to die out, or nearly so. The focus of combustion is thereby moved forward from its customary place into the center of the furnace, over the iron or other substance which is being roasted, melted, heated, or refined. The effect of the burning fuel upon the work is thereby, by its nearer proximity, very greatly increased.

It will be seen that by this method smaller fire-boxes and roofs may be employed than are necessary in burning massive fuel.

In the English patent of P. J. F. Mouchel, No. 925, 1854, the inventor suggests the injection of powdered ores and fuel, either separately or together, upon a hearth or inclined plane of a cast-iron box or furnace, heated by the waste heat of other furnaces.

As an apparatus of this construction would not endure the temperatures necessary in the heating and melting of iron and steel, it can be used only for the reduction of iron ores in contact with small coal at a low red heat. The same result is attained with more or less economy by the use of revolving cast-iron cylinders, heated externally to a dark red, and into which coarsely pulverized coal and iron ore are fed or projected.

The use of pulverized fuel by our method, as a substitute for massive coal, requires the use of reverberatory furnaces, built upon the same general plan and of the same materials with those at present in use.

We find the employment of finely-pulverized coal and other fuels advantageous in many processes beside those referred to in the above description; for instance, as in the generation of steam, the fuel would be projected by the blow-pipe into the fire-box of the boiler-furnace, and becoming ignited at this point pass the entire length of the fire-chamber under the boiler.

In steam-generating furnaces, as well as in those used for the manufacture of iron, the grate-bars and fire-box may be limited to one-fourth or one-fifth of their usual area.

We do not regard it as material that the fire-box of the furnace should be heated by solid coal, or by any other solid fuel laid upon grate-bars. The fire-box, where the pulverized fuel is to be ignited upon its first entrance, may be heated by any convenient method, either by waste heat, by hot air taken from another furnace, or by gas flames, jets of gas, or inflammable vapors, the purpose of these being not primarily to furnish heat further than is necessary for the first ignition of the pulverized fuel.

We claim—

1. The use of finely-comminuted fuel or dust of fuel, mingled with the air used in supporting the combustion of the gases of furnaces or fire-boxes, substantially as and for the purposes described.

2. The use of the excessively fine floated powder or dust of fuel, prepared in the manner described by us, and projected by the air-jet or blast of a pulverizing-mill, in combination with the fire-box of a reverberatory or other air or flame furnace, substantially as and for the purpose described.

3. The application of the pulverized fuel, as described, to be used as a prime agent of combustion in the heating of furnaces as a substitute for solid and massive fuel used upon grate-bars, substantially as and for the purpose described.

4. The utilization of waste or broken coals and other fuels, substantially as and for the purpose described.

5. The heating of reverberatory furnaces or fire-chambers used in the preparation of metals or in the generation of steam, by finely-divided solid fuel, suspended or floated in the air above the hearth or sole, and beneath the cover or cope of the furnace itself, the same to be used as the prime agent or sole agent in heating, substantially as and for the purposes above described.

JAMES D. WHELPLEY.
JACOB J. STORER.

Witnesses:
CHAS. M. NICKERSON,
EDWARD RENOUF.